Oct. 2, 1928.

H. D. GILLIES 1,686,209

MOTOR AND OTHER VEHICLE

Filed Nov. 30, 1925

H. D. Gillies
INVENTOR

By: Marks & Clerk
Attys

Patented Oct. 2, 1928.

1,686,209

UNITED STATES PATENT OFFICE.

HAROLD DELF GILLIES, OF LONDON, ENGLAND.

MOTOR AND OTHER VEHICLE.

Application filed November 30, 1925, Serial No. 72,258, and in Great Britain December 2, 1924.

This invention relates to vehicles with more particular reference to motor vehicles and has for its object to provide fittings upon the vehicle such as a table and/or locker or cupboard which will take up very little room and will not in any way interfere with the comfort of the occupants of the vehicle nor with the appearance of the latter but which will be capable of fulfilling efficiently the functions for which such fittings are designed.

The present invention consists in a vehicle provided with a seat the back or squab of which is hinged or pivoted or otherwise arranged to form a table adapted to be supported by the body of the vehicle, so that the seat is still available for use in addition to the table.

The invention also consists in a vehicle having a seat the back or squab of which is hinged at its upper end to the vehicle body while the lower end is provided with means adapted to be supported upon the vehicle body so that the back or squab may thus be turned in a substantially horizontal position in order to form a table.

The invention also consists in other details and arrangements hereinafter described or indicated.

In carrying my invention into effect in one convenient manner I arrange the front squab or back next to the front seats to be supported near the top by lateral swivel fittings or pivots let into the sides of the vehicle body or otherwise suitably arranged so that the whole may be swung into a substantially horizontal position in order that it may be used as a table by the occupants of the vehicle, the hinged or swivelling part thus provided being normally bolted or otherwise locked in its normal position in which it serves as a back or squab for the front seat, and such bolt and other locking, fitting or fittings may also be adapted to co-operate with the sides of the vehicle body or with some other fixed part or structure in order to maintain the table rigid in its horizontal position when so adjusted for use as a table.

The back of the squab itself may be adapted to serve as the table or I may provide a special slab or the like for the purpose, and in the one case the squab may be formed also to serve as a locker while in the other case the part between the seat back and the table member may be adapted to serve as a locker, the table member in both cases being hinged or otherwise provided with a movable or removable part or the whole being movable or removable to enable access to be obtained to the locker or cupboard so formed.

One construction in accordance with the invention is illustrated by way of example in the accompanying drawings, in which:—

Figure 1:
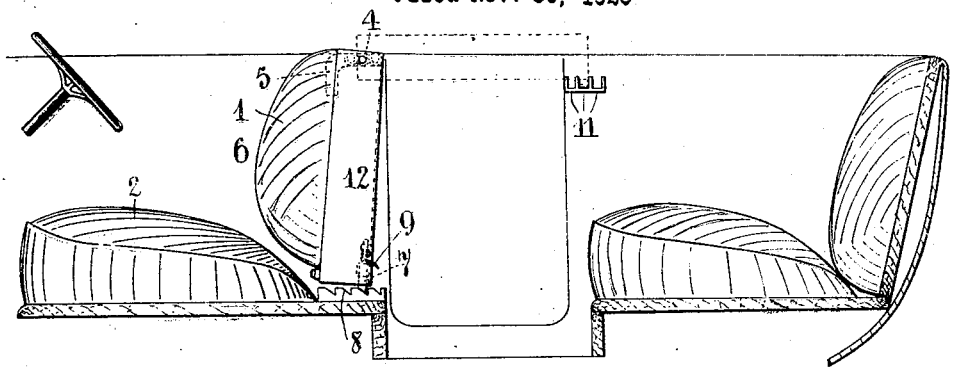
Figure 1 is a fragmentary section of the body of a vehicle.

In the construction illustrated in the drawings, the squab or back 1 of the front seats 2 is provided near the top with lateral pivots 3 engaging a bearing 4 which, as shown in Figure 1, is one of a number of such bearings provided in a fitting 5 secured to the side of the car 6. The lower end of the squab is provided with a spring bolt 7 adapted to engage the rack 8, a finger grip 9 being provided for releasing the squab from such engagement. The purpose of providing a rack and a plurality of bearings is to enable the position of the said squab to be adjusted in accordance with the stature of the driver.

When it is desired that the back or squab shall function as a table, the bolt above referred to is released and the squab rotated into the position shown in dotted lines in Figure 1 in which pivoted arms 10 may be engaged in one or other of the sockets 11 secured to the sides of the vehicle.

Figure 2:
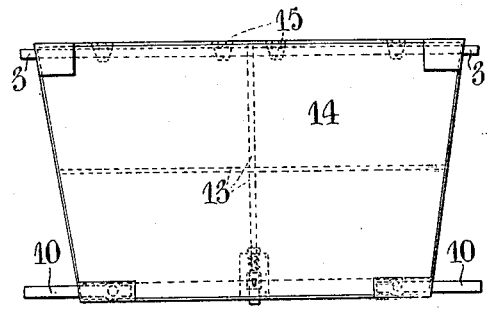
Figure 2 is a view in elevation of the seat back or squab.
Figure 3:
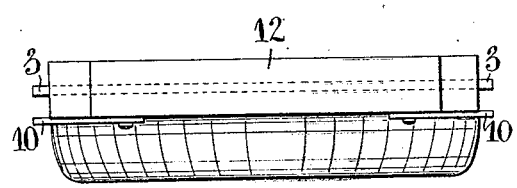
Figure 3 is a view in plan.
Figure 4:
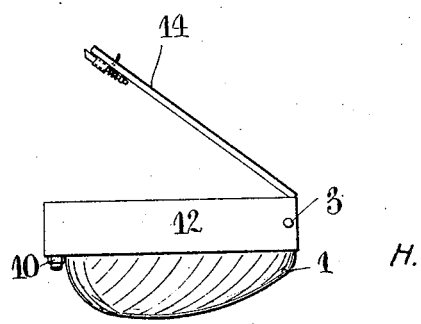
Figure 4 is a side elevation.

The portion 12 of the squab behind the upholstery is arranged to function as a locker which may be divided into suitable compartments as indicated in Figure 2 by division members 13. The portion of the device forming the table top 14 will in such case be provided with hinges 15 as shown so that it may be raised to enable access to the locker.

When the squab is functioning as a table the occupants of the front seats may turn round and face the passengers in the rear seats, which will be found to be a great convenience when the car is standing as at a picnic, race-meeting or the like.

The accommodation of the locker may, of course, be varied in accordance with requirements; parts of it may be designed to accommodate kettles and like utensils while other parts may be arranged to contain food.

Arrangements may be made to secure the ventilation of the latter portion and for this purpose the pivot may be hollow and may be arranged to extend through the body of the car, being in such case provided, if desired, with cowl ventilators so that air will circulate through the compartments and keep the contents cool.

When in the position shown dotted in Figure 1 the device, in addition to being able to function as a table, may be employed as a platform on which a person may stand (for example to obtain a better view) and if rotated through a further half circle so that the squab is uppermost (further brackets being provided to take the arms 10 in such position) it may be employed as an elevated seat. Moreover the construction may be such that the device may be entirely removed from its socket, in which case it may be used as a seat upon the floor of the vehicle or upon the ground or elsewhere.

While in the construction illustrated in the drawings the back or squab is arranged to be elevated as a whole to form a table, the invention is not limited in this respect for in certain cases it may be desirable or necessary to divide the back or squab into two parts corresponding with each of the front seats, in which case either or both of the squabs may be raised into position. In this case the provision of a leg member or other suitable support on the side of each or both of the backs or squabs remote from the side of the vehicle may be desirable.

If necessary or desirable a recessed block or the like may be adopted for the purpose of taking the overhanging lower end of the table or the like when in the substantially vertical position or position it occupies when not in use in order to obtain a convenient fastening means and providing for the necessary rigidity in the structure but it will be understood that the invention is not to be limited to the foregoing details which are given purely by way or illustration since I may vary the number, mode of disposition and manner of construction of the tables or like fittings depending upon any particular practical requirements and I may apply the invention with equal effect and like advantage to all types of bodies whether open or closed and to all suitable styles of tables or like fittings which may be required.

Having now described my invention what I claim as new and desire to secure by Letters Patent is:—

1. In combination with a vehicle, a seat, a back for said seat rotatably mounted on bearings at its upper end, means mounted upon the sides of the lower end of said back adapted when said back as a whole is rotated to a horizontal position to coact with further means mounted upon the sides of said vehicle in substantially the same horizontal plane as said bearings and at a distance to the rear thereof substantially equal to the height of said back to hold said back in a horizontal position.

2. In combination with a vehicle, a seat, a removable back for said seat, pins projecting laterally from the sides of the upper end of said back and adapted to rest in bearings located on the side of the vehicle, said back being rotatable as a whole about said bearings, arms adapted to project laterally from the sides of the lower end of said seat and to engage upon rotation of said back with sockets located on the side of the vehicle in substantially the same horizontal plane as said bearings and at a distance to the rear thereof substantially equal to the height of said back.

3. In combination with a vehicle, a seat, a removable back for said seat having a pin projecting from each side at the upper end thereof, a plurality of bearings for said pins about which said back as a whole is adapted to rotate, pivoted arms located at the lower end of said back adapted to engage with sockets mounted on the side of said vehicle in substantially the same horizontal plane as said bearings and at a distance therefrom substantially equal to the height of said back, means being provided at the lower end of said back adapted to regulate the tilting angle thereof.

4. In combination with a vehicle, a seat, a hollow back for said seat having a hinged lid and a plurality of compartments, pins projecting laterally from the sides of the upper end of said seat and adapted to rest in bearings located on the side of the vehicle, said seat being as a whole rotatable about said bearings, arms adapted to project laterally from the sides of the lower end of said seat and to engage upon rotation of said seat with sockets located on the side of the vehicle in substantially the same horizontal plane as said bearings and at a distance to the rear thereof substantially equal to the height of said back and means at the lower end of said back adapted to regulate the tilt thereof.

In testimony whereof, I have signed my name to this specification.

HAROLD DELF GILLIES.